United States Patent [19]

Aonuma

[11] Patent Number: 5,233,555
[45] Date of Patent: Aug. 3, 1993

[54] METHOD OF ERASING RESIDUAL RADIATION INFORMATION ON STIMULABLE PHOSPHOR SHEET

[75] Inventor: Masashi Aonuma, Kanagawa, Japan
[73] Assignee: Fuji Photo Film Co., Ltd., Kanagawa, Japan
[21] Appl. No.: 685,765
[22] Filed: Apr. 16, 1991
[30] Foreign Application Priority Data
Apr. 20, 1990 [JP] Japan .................. 2-105685
[51] Int. Cl.$^5$ .................................. G11C 13/00
[52] U.S. Cl. ........................... 365/106; 250/588
[58] Field of Search .............. 365/106, 120, 127, 218; 250/327.2 H, 484.1 B

[56] References Cited

U.S. PATENT DOCUMENTS

| | | | |
|---|---|---|---|
| 3,479,651 | 11/1969 | Bowers | 365/218 |
| 3,801,966 | 4/1974 | Terao | 365/106 |
| 4,052,705 | 10/1977 | Schaefer | 365/112 |
| 4,496,838 | 1/1985 | Umemoto | 250/327.2 H |
| 4,574,366 | 3/1986 | Potember | 365/127 |
| 4,584,482 | 4/1986 | Suzuki | 250/327.2 H |
| 4,786,808 | 11/1988 | Saito | 250/327.2 H |

FOREIGN PATENT DOCUMENTS

| | | |
|---|---|---|
| 55-12429 | 1/1980 | Japan . |
| 55-116340 | 9/1980 | Japan . |
| 55-163472 | 12/1980 | Japan . |
| 56-11392 | 2/1981 | Japan . |
| 56-11395 | 2/1981 | Japan . |
| 56-12599 | 2/1981 | Japan . |
| 56-104645 | 8/1981 | Japan . |
| 59-192240 | 10/1984 | Japan . |

*Primary Examiner*—Eugene R. LaRoche
*Assistant Examiner*—A. Zarabian
*Attorney, Agent, or Firm*—Sughrue, Mion, Zinn, Macpeak & Seas

[57] ABSTRACT

The present invention relates to a method of erasing a radiation image information which remains on a stimulable phosphor sheet on which the radiation image information is stored and recorded. This method is employed in a medical diagnosis system. The medical diagnosis system basically comprises a console, an X-ray controller, a radiation image information recording and reading apparatus, and an image output apparatus. Further, the residual radiation image information erasing method referred to above comprises the steps of specifying an area for recording the radiation image information stored and recorded on the stimulable phosphor sheet, based on exposure information, and erasing only radiation image information which remains in the specified recording area on the stimulable phosphor sheet.

4 Claims, 4 Drawing Sheets

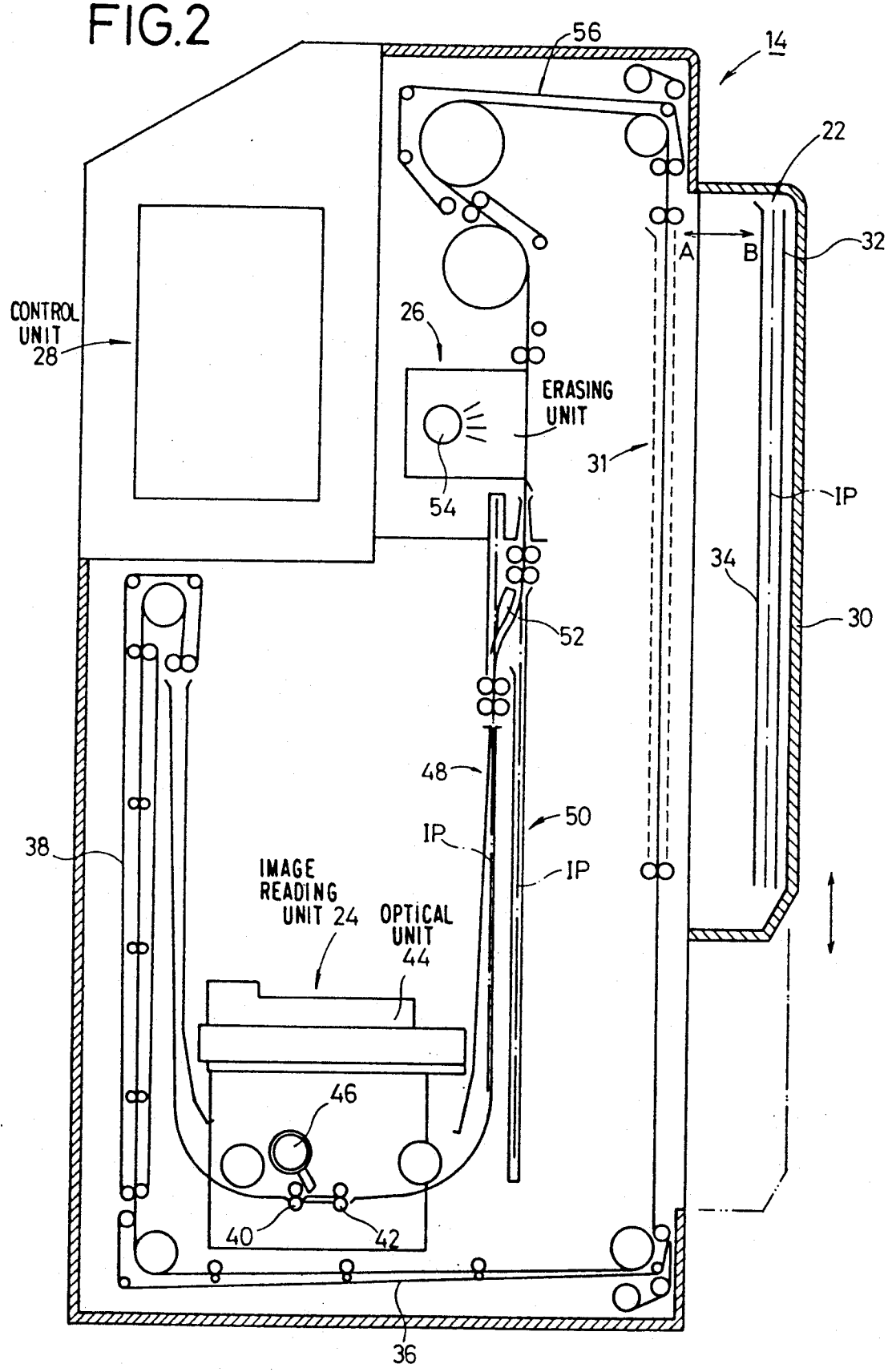

FIG.3

```
         IP
          ↓                U
      ┌─────────┐          ↑
      │ FIRST SECTION │    │
      ├─────────┤          │  HALF-SCREEN AT UPPER
      │ SECOND SECTION│    │  REFERENCE
      ├─────────┤          │
      │ THIRD SECTION │    │
      ├─────────┤          ┼
      │ FOURTH SECTION│    │
      ├─────────┤          │  HALF-SCREEN AT LOWER
      │ FIFTH SECTION │    │  REFERENCE
      ├─────────┤          │
      │ SIXTH SECTION │    ↓
      └─────────┘          L
```

FIG.4

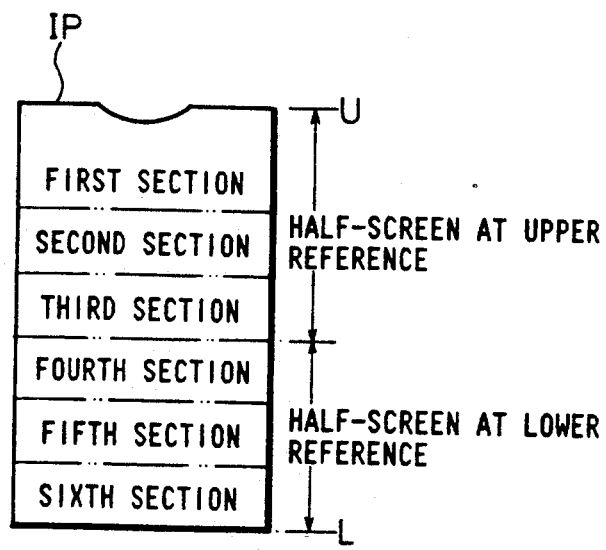

| SECTION | FULL SCREEN | UPPER REFERENCE | LOWER REFERENCE |
|---|---|---|---|
| FIRST SECTION | 8 SECONDS | 8 SECONDS | +0 SECONDS |
| SECOND SECTION | 8 SECONDS | 8 SECONDS | +0 SECONDS |
| THIRD SECTION | 8 SECONDS | 8 SECONDS | 8 SECONDS |
| FOURTH SECTION | 8 SECONDS | 8 SECONDS | 8 SECONDS |
| FIFTH SECTION | 8 SECONDS | +0 SECONDS | 8 SECONDS |
| SIXTH SECTION | 8 SECONDS | +0 SECONDS | 8 SECONDS |

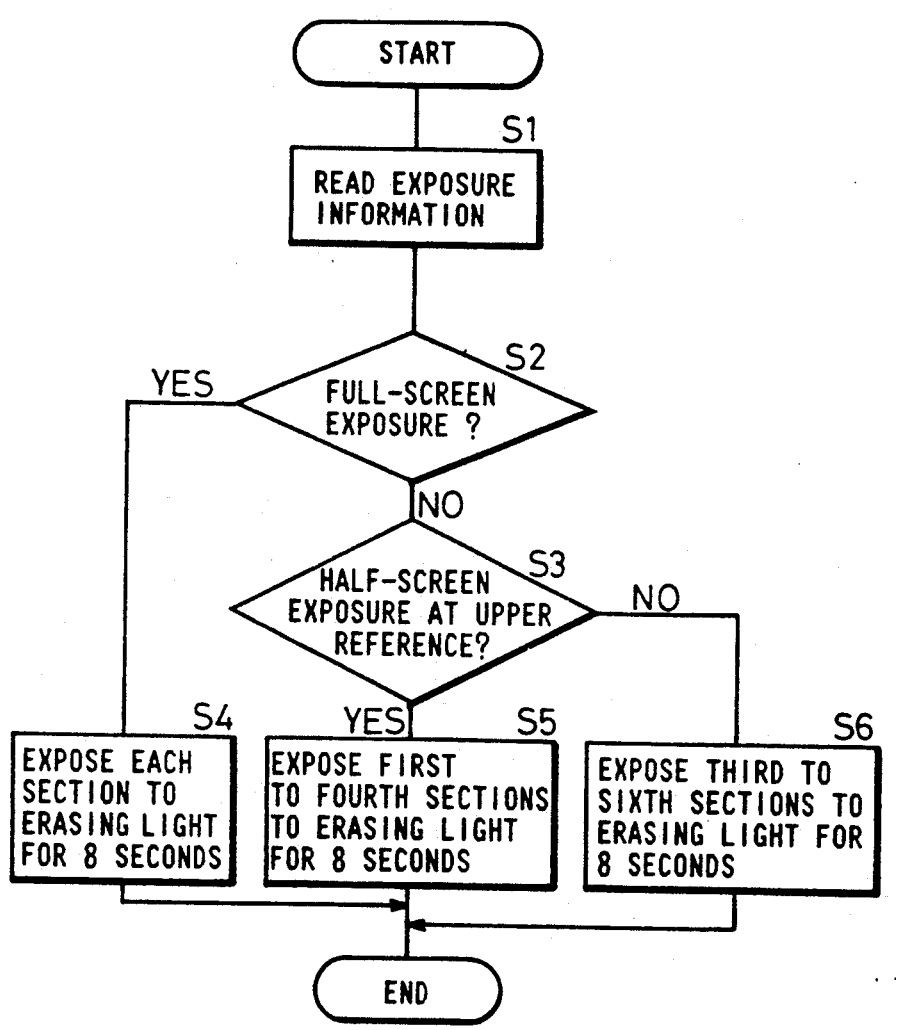

METHOD OF ERASING RESIDUAL RADIATION INFORMATION ON STIMULABLE PHOSPHOR SHEET

BACKGROUND OF THE INVENTION

1. Field of the Invention

The present invention relates to a method of erasing radiation image information which remains on a stimulable phosphor sheet the cycle time for executing radiation image information recording and reading processing can be shortened by, for example, erasing only that radiation image information area on a long stimulable phosphor sheet which is actually subjected to radiation exposure.

2. Description of the Related Art

There has recently been proposed a radiation image information recording and reproducing system wherein the radiation-transmitted image of an object such as a human body is produced using a stimulable phosphor to obtain radiation image information that is temporarily stored and recorded on a stimulable phosphor or sheet, and the stimulable phosphor sheet is scanned with exciter rays to emit accelerated light for photoelectrically reading the emitted light so as to produce an image signal that is electrically processed for generating radiation image information of the object appropriate to the diagnosis (see Japanese Patent Application Laid-Open Nos. 55-12429, 56-11395, 55-163472, 56-104645, 55-116340, etc.).

In the radiation image information recording and reproducing system, a final image may be reproduced as a hard copy or may be reproduced as a visible image on a CRT. According to the radiation image information recording and reproducing system referred to above, the stimulable phosphor sheet is used to temporarily bear image information in order to apply the above final image to a recording medium without finally recording image information on the stimulable phosphor sheet. Therefore, the stimulable phosphor sheet referred to above may be repeatedly used, and hence the repetitive use of the stimulable phosphor sheet permits considerable economies.

As described above, the reuse of the stimulable phosphor sheet is performed in the following manner. Namely, the energy of radiation, which remains on the stimulable phosphor sheet after the accelerated light emitted therefrom is read, is discharged by a method described in Japanese Patent Application Laid-Open Nos. 56-11392 and 56-12599, for example, so as to erase remaining or residual radiation image information. Thereafter, such a stimulable phosphor sheet may be used again to record the radiation image information.

There has already been proposed by the present applicant a so-called built-in type radiation image information recording and reading apparatus of such a type that a circulating feed means for feeding a stimulable phosphor sheet capable of storing and recording a radiation image thereon along a predetermined circulating passage, an image recording unit disposed on the circulating passage, for exposing the stimulable phosphor sheet to a radiation having image information to store and record radiation-transmitted image information of an object on the stimulable phosphor sheet, an image reading unit disposed on the circulating passage and comprising an exciter light source for generating exciter rays used to scan the stimulable phosphor sheet on which the radiation-transmitted image information of the object is stored and recorded in the image recording unit and a photoelectric reading means for photoelectrically reading accelerated light emitted from the stimulable phosphor sheet scanned with the exciter rays so as to produce an image signal, and an erasing unit disposed on the circulating passage, for discharging the radiation energy which remains on the stimulable phosphor sheet before the image recording is made to a stimulable phosphor sheet after the image reading is performed in the image reading unit, are all incorporated into a single apparatus, and the stimulable phosphor sheet is caused to circulate among the respective units mentioned above so as to be repeatedly used (see Japanese Patent Application Laid-Open No. 59-192240).

The radiation image information recording and reading apparatus having such a structure is advantageous in that the recording and reading of the radiation image information can continuously and efficiently be carried out.

The built-in type radiation image information recording and reading apparatus is intended to record a radiation-transmitted image of the chest, the abdomen, the limbs or the like of a patient. The stimulable phosphor sheet used to record the same is selected so as to be the same size as predetermined film formats (for example, a film format of 354 mm×430 mm or greater) corresponding to the images of these parts of the patient to be recorded.

There has recently been demand for the diagnosis of the whole length of the spine (a so-called diagnosis of all the vertebrae) using the built-in type radiation image information recording and reading apparatus. It is therefore convenient if a long stimulable phosphor sheet having the length corresponding to the full length of the spine to be recorded is used when the diagnosis of the whole spine is performed using the built-in type radiation image information recording and reading apparatus.

It is desirable that the built-in type radiation image information recording and reading apparatus using the long stimulable phosphor sheet is employed even in the exposure of the chest, the abdomen, the limbs or the like as well as in the exposure of the whole spine in order to improve the rate of operation of the apparatus or the like. In this case, an image is recorded only on a part of the stimulable phosphor sheet, which corresponds in size to a part subjected to exposure.

However, the above-described erasing method which has been employed in the above-mentioned conventional apparatus has the problem in that since the erasing of the radiation image information from the stimulable phosphor sheet is always made to the overall recording area of the stimulable phosphor sheet, that is, the full area, the unnecessary time taken for the erasure of an image-unrecorded area on the long stimulable phosphor sheet is made where the radiation image information is recorded only on a part of the long stimulable phosphor sheet and the erasure of the residual image information with respect to the part thereof is performed over its full area, thereby resulting in a considerable increase in the cycle time required to record, read and erase the radiation image information.

SUMMARY OF THE INVENTION

With the foregoing problem in view, it is a principal object of the present invention to provide a method of erasing radiation image information which remains on a stimulable phosphor sheet wherein the cycle time for executing radiation image information recording and reading processing can be shortened by erasing only that residual radiation image information area on a long stimulable phosphor sheet, which is actually subjected to radiation exposure.

It is another object of the present invention to provide a method of erasing radiation image information which remains on a stimulable phosphor sheet on which the radiation image information is stored and recorded, the method comprising the steps of specifying an area for recording the radiation image information stored and recorded on the stimulable phosphor sheet, based on exposure information, and erasing only radiation image information which remains in the specified recording area on the stimulable phosphor sheet.

It is a further object of the present invention to provide the method wherein the radiation image information recording area is divided into a plurality of sections, along the direction of length of the stimulable phosphor sheet, and the feeding speed of the stimulable phosphor sheet is made faster with respect to sections where it is unnecessary to erase the residual radiation image information from the stimulable phosphor sheet, the sections being selected out of the plurality of sections.

It is a still further object of the present invention to provide the method wherein erasing light from an erasing light source is applied even to sections adjacent to sections where it is necessary to erase the residual image information from the stimulable phosphor sheet.

It is a still further object of the present invention to provide the method wherein the radiation image information recording area is at least any one of a substantially full area of the stimulable phosphor sheet, one half area obtained by dividing the full area thereof into two along the direction of length of the stimulable phosphor sheet, and the other half area.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIG. 2 is a diagram showing a structure of a radiation image information recording and reading apparatus employed in the medical diagnosis system shown in FIG. 1;

FIG. 3 is a diagram for describing the assignment of sections on the stimulable phosphor sheet;

FIG. 4 is a diagram for describing the time required to erase the radiation image information which remains on the stimulable phosphor sheet: and FIG. 5 is a flowchart for describing the procedure for executing the method according to said one embodiment of the present invention, for erasing the image information which remains on the stimulable phosphor sheet.

DETAILED DESCRIPTION OF THE PREFERRED EMBODIMENTS

Figure 1:
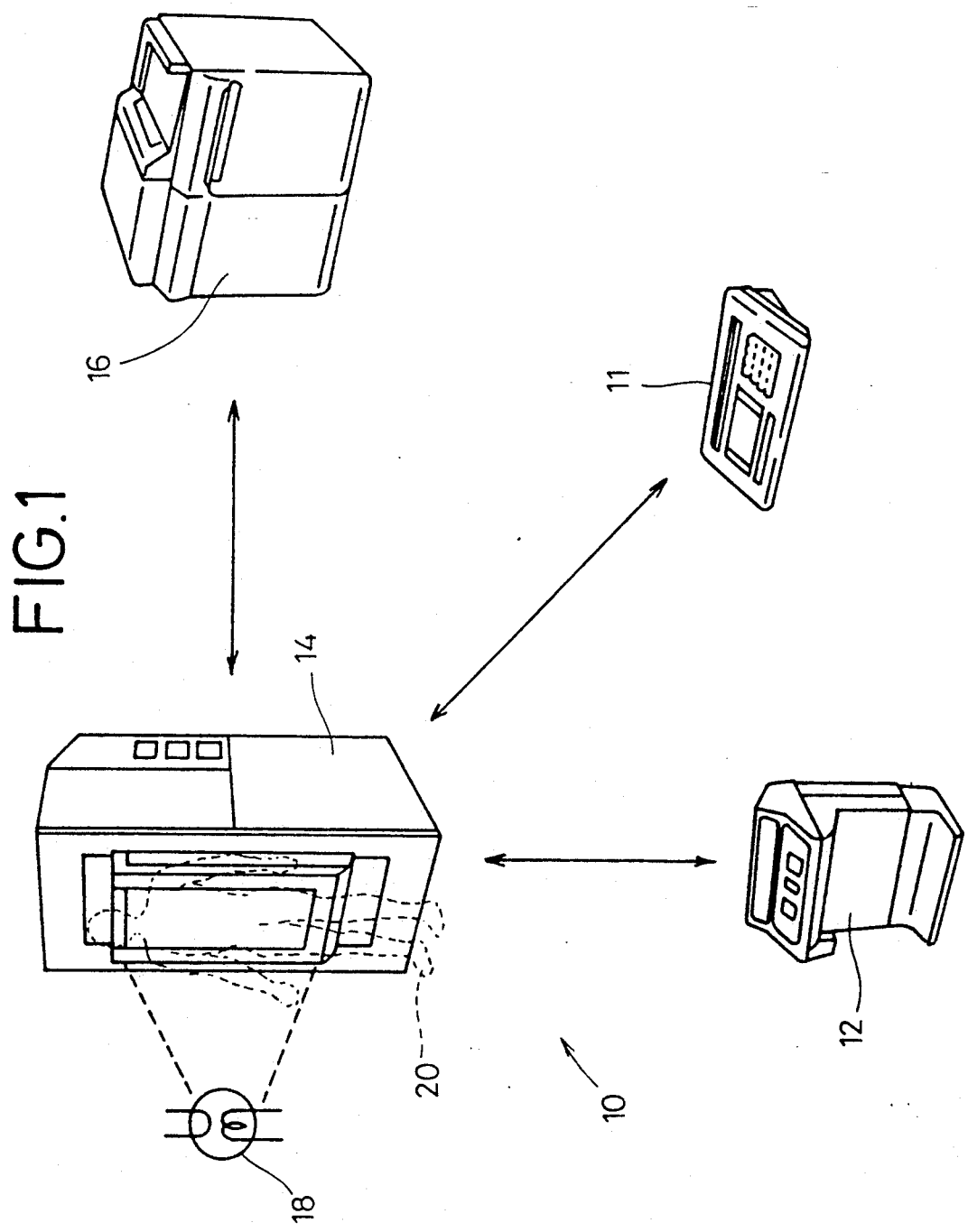
FIG. 1 is a schematic diagram of a medical diagnosis system to which a method according to one embodiment of the present invention, for erasing radiation image information which remains on a stimulable phosphor sheet, is applied.

Referring to FIG. 1, designated at numeral 10 is a medical diagnosis system to which a method according to one embodiment of the present invention, for erasing radiation image information which remains on a stimulable phosphor sheet, is applied. The medical diagnosis system 10 basically comprises a console 11, an X-ray controller 12, a radiation image information recording and reading apparatus 14, and an image output apparatus 16.

The console 11 is used to input exposure information (exposure standard and exposure size to be described later).

The X-ray controller 12 serves to control a radiation source 18 and to expose an object 20 to an X-ray in predetermined timing and in predetermined amounts.

The radiation image information recording and reading apparatus 14 stores and records an X-ray transmitted image of a predetermined part of the object 20 irradiated by X-rays from the X-ray source 18 on a stimulable phosphor sheet IP (see FIG. 2). In addition, the radiation image information recording and reading apparatus 14 reads the image stored and recorded on the stimulable phosphor sheet IP and converts the so-read image into an electric signal, which is in turn electrically subjected to prescribed image processing. Incidentally, the size of the stimulable phosphor sheet IP is selected so as to match a long size frame format substantially twice the half size frame format.

The image output apparatus 16 serves to display the X-ray transmitted image of the predetermined part of the object 20 on a photographic film as a visible image, based on an image signal delivered from the radiation image information recording and reading apparatus 14.

FIG. 2 shows the overall structure of the radiation image information recording and reading apparatus 14. The radiation image information recording and reading apparatus 14 comprises an exposure unit 22 for irradiating the stimulable phosphor sheet IP with the X-ray via the object 20 so as to produce the X-ray transmitted image thereby storing and recording the image on the stimulable phosphor sheet IP, an image reading unit 24 for exposing the stimulable phosphor sheet IP on which the image is stored and recorded to exciter rays so as to photoelectrically read accelerated light emitted from the stimulable phosphor sheet IP, an erasing unit 26 for discharging the energy of the radiation which remains on the stimulable phosphor sheet IP before the image is recorded again on stimulable phosphor sheet IP after the above image reading is performed, and a control unit 28.

The exposure unit 22 projects in the front of the radiation image information recording and reading apparatus 14, and has an exposure table 30 shiftable in upward and downward directions along the front thereof. The exposure table 30 has a front plate 32 and, a rear plate 34 both of which hold the stimulable phosphor sheet IP therebetween and can move between the front of the exposure unit 22 and a first stand-by portion 31 by an unillustrated link mechanism in the directions indicated by the arrows A and B.

The image reading unit 24 is connected to the exposure unit 22 through feed systems 36, 38. The image reading unit 24 comprises two pairs of nip rollers 40, 42 each serving to hold the stimulable phosphor sheet IP therebetween supplied through the feed system 38, an optical unit 44 used to expose the stimulable phosphor sheet IP held between the nip rollers 40 and 42 to a laser beam as scanning light, and a condenser unit 46 for reading an image recorded on the stimulable phosphor sheet IP as accelerated light emitted from the stimulable phosphor sheet IP in response to the irradiated laser beam.

At the rear stage of the image reading unit 24, there are provided a second stand-by portion 48 which extends in a vertical direction so as to temporarily accommodate the stimulable phosphor sheet IP in a continuous length, and a third stand-by portion 50 provided side by side with respect to the second stand-by portion 48. Incidentally, the second stand-by portion 48 is connected to the third stand-by portion 50 with a path selector 52.

The erasing unit 26 provided above the third stand-by portion 50 has an erasing light source 54 such as a halogen lamp, and serves to erase an image which remains on the stimulable phosphor sheet IP with erasing light produced by the erasing light source 54. A rear stage of the erasing unit 26 is coupled to the first stand-by portion 31 by way of the feed system 56.

The control unit 28 controls the operation for the erase processing of the residual image on the stimulable phosphor sheet IP, and also controls the operations of other units in the radiation image information recording and reading apparatus 14. Incidentally, the erase processing in the present embodiment is performed in such a manner that an area defined between an upper reference U and a lower reference L of the long stimulable phosphor sheet IP is divided into six sections which comprise a first section to a sixth section as shown in FIG. 3, and the erasing time is adjusted according to exposure information {full-screen exposure (first section to six section), a half-screen exposure at the upper reference U (first section to third section), and a half-screen exposure at the lower reference L (fourth section to sixth section)}. In this case, the erasing time at each section is set as a look-up table 57 as shown in FIG. 4 so as to be stored in advance in the control unit 28. Referring to FIG. 4, "+0 second" represents a period of time which is greater than 0 second and less than 1 second.

The medical diagnosis system 10 to which the residual radiation image information erasing method is applied is constructed as described above. The operation of the medical diagnosis system 10 will now be described.

A radiographer (not shown) first inputs exposure information corresponding to exposure parts (the whole spine, the chest, the abdomen or the like) of the object 20. The exposure information is read by the control unit 28.

Under the state referred to above, three long stimulable phosphor sheets IP for covering the whole spine are charged into the first to third stand-by portions 31, 48, 50 shown in FIG. 2 respectively in the radiation image information recording and reading apparatus 14.

Then, the control unit 28 displaces the exposure table 30 in upward and downward directions so as to match predetermined positions in response to the exposure information. Thereafter, the unillustrated link mechanism is actuated to move the stimulable phosphor sheet IP held in the first stand-by portion 31 in the direction indicated by the arrow B, thereby placing the same in the front part of the exposure table 30. Then, the object 20 is set in a state in which it stands in front of the exposure table 30 of the exposure unit 22. Thereafter, the X-ray controller 12 is used to control the radiation source 18, thereby irradiating the object 20 with the X-ray. In this case, the X-ray is caused to pass through the object 20 thereby recording a radiation-transmitted image of a predetermined part of the object 20 on the stimulable phosphor sheet IP.

The stimulable phosphor sheet IP on which the radiation-transmitted image thereof is recorded is temporarily moved in the direction indicated by the arrow A, and thereafter fed to the image reading unit 24 by the feed systems 36, 38.

On the other hand, the stimulable phosphor sheet IP held in the third stand-by portion 50 is fed to the first stand-by portion 3 by the feed system 56 so as to be placed on a following-exposure waiting state. In addition, the stimulable phosphor sheet IP subjected to a waiting state in the second stand-by portion 48 is fed to the third stand-by portion 50 in accordance with the procedure to be described later.

In the image reading unit 24, the stimulable phosphor sheet IP held between and fed by each of the nip rollers 40, 42 is exposed to a laser beam produced by the optical unit 44, so that the stimulable phosphor sheet IP emits accelerated light. The emitted light is concentrated at the condenser unit 46 so as to be converted into an electric signal.

Incidentally, so-called look-ahead and look-through processes are performed as needed in the image reading unit 24. The purpose of the look-ahead process is to roughly read the radiation image information recorded in advance on the stimulable phosphor sheet IP, thereby setting up image processing conditions. On the other hand, the purpose of the look-through process is to reliably read the radiation image information based on the image processing conditions set by the look-ahead process. After the look-ahead process is performed by causing the stimulable phosphor sheet IP to pass through the image reading unit 24, the stimulable phosphor sheet IP is temporarily returned to the side of the feed system 38. Then, the stimulable phosphor sheet IP is caused to pass through the image reading unit 24 again so as to execute the look-through process.

The stimulable phosphor sheet IP from which the radiation image information is read is fed to the feed system 56 through the erasing unit 26, and thereafter returned to the third stand-by portion 50. In this case, the radiation image information is erased by the erasing light source 54 of the erasing unit 26 under the control of the control unit 28. This erase processing will now be described with reference to a flowchart shown in FIG. 5.

In this case, the above-described exposure information (the full-screen exposure, the half-screen exposure at the upper reference U or the half-screen exposure at the lower reference L) has already been read by the control unit 28 (Step S1).

Thus, a recording area of the radiation image information stored and recorded on the stimulable phosphor sheet IP is specified based on the exposure information as shown in Steps S2 and S3 (First process).

More specifically, it is determined in Step S2 whether or not the exposure information represents the full-screen exposure. If it is determined to be positive, the feeding speed of the stimulable phosphor sheet IP is controlled in such a manner that each of the sections (see FIG. 3) of the stimulable phosphor sheet IP is exposed to erasing light for 8 seconds, on referring to the look-up table 57 shown in FIG. 4 (Step S4). On the other hand, if it is judged to be negative in Step S2, it is determined in Step S3 whether the exposure standard is either the half-screen exposure at the upper reference U or the half-screen exposure at the lower reference L. If it is determined to be the former in Step. S3, the feeding speed of the stimulable phosphor sheet IP is controlled in such a way that the first to fourth sections of the stimulable phosphor sheet IP are exposed to the erasing light for 8 seconds as shown in Step S5. In addition, the feeding speed of the stimulable phosphor sheet IP is controlled at a high speed between the fifth and sixth sections. Incidentally, the reason for exposing the fourth section to the erasing light in the same manner as the first to third sections is that a slight overlap of the X-ray even with respect to the fourth section at the time of exposure of the first to third sections to the erasing light, is taken into consideration. If it is judged to be latter in Step S3, the feeding speed of the stimulable phosphor sheet IP is controlled at a high speed between the first and second sections contrary to the half-screen exposure at the upper reference U, whereas the feeding speed of the stimulable phosphor sheet IP is controlled at a low speed between the third section and the sixth section in such a manner that the third to sixth sections are exposed to the erasing light for 8 seconds, as shown in Step S6. In other words, the feeding speed of the stimulable phosphor sheet IP is controlled such that only the specified recording area of the stimulable phosphor sheet IP is erased in Steps S4 to S6 (Second process).

Incidentally, the erasing light is not applied to the stimulable phosphor sheet IP for "+0 second" by controlling the feeding speed of the stimulable phosphor sheet IP at the high speed. It is therefore possible to reliably erase an unnecessary image produced by exposing parts other than the parts to be recorded to scattered X-rays upon exposure.

As described above, the stimulable phosphor sheet IP from which the radiation image information is erased is fed to the first stand-by portion 31 through the erasing unit 26 and the feed system 56 after it is confirmed that the first stand-by portion 31 is empty. Thereafter, the stimulable phosphor sheet IP is placed on a waiting state for the next exposure.

On the other hand, the radiation image converted into the electric signal by the condenser unit 46 is subjected to image processing such as gradation processing, frequency processing, etc. in the control unit 28. Thereafter, the radiation image is supplied to a frame memory (not shown) and then delivered to the image output apparatus 16 through an interface (not shown). The image output apparatus 16 displays or records an image on a photographic film F based on the image signal. As a result, the image recorded on the photographic film F can be subjected to a diagnosis by a doctor or the like. Incidentally, the above-described embodiment has shown and described where the radiation image is recorded on the photographic film F. However, the radiation image may be displayed on a CRT or the like.

According to the method of the present invention for erasing the image information which remains on the stimulable phosphor sheet, as has been described above, the exposure information about the parts to be recorded is inputted so as to specify the recording area of the radiation image information stored and recorded on the stimulable phosphor sheet based on the inputted exposure information, thereby erasing only the so-specified recording area on the storage type phosphor sheet. Therefore, the processing for erasing the, radiation energy which remains on the long stimulable phosphor sheet can efficiently be performed, thereby making it possible to shorten the cycle time for the execution of the radiation image information recording and reading processing.

Having now fully described the invention, it will be apparent to those skilled in the art that many changes and modifications can be made without departing from the spirit or scope of the invention as set forth herein.

What is claimed is:

1. A method of erasing radiation IMAGE information which remains on a stimulable phosphor sheet on which the radiation image information is stored and recorded, said method comprising the steps of:

specifying an area for recording the radiation IMAGE information stored and recorded on said stimulable phosphor sheet, based on exposure information; and erasing only radiation IMAGE information which remains in said specified recording area on said stimulable phosphor sheet.

2. The method according to claim 1, wherein said radiation image information recording area is divided into a plurality of sections along the direction of length of said stimulable phosphor sheet, and the feeding speed of said stimulable phosphor sheet is made faster with respect to sections where it is unnecessary to erase the residual radiation image information from said stimulable phosphor sheet, said sections being selected out of said plurality of sections.

3. The method according to claim 2, wherein erasing light from an erasing light source is applied even to sections adjacent to sections where it is necessary to erase the residual image information from said stimulable phosphor sheet.

4. The method according to claim 1, wherein said radiation image information recording area is at least any one of a substantially full area of said stimulable phosphor sheet, and either one of two half areas obtained by dividing said substantially full area along the direction of length of said stimulable phosphor sheet into two half areas.

* * * * *